April 21, 1953

C. E. COX 2,636,117

RADIO RECEIVING SYSTEM

Filed Feb. 21, 1949

Inventor

Clifford E. Cox

By Lyon & Lyon

Attorneys

Patented Apr. 21, 1953

2,636,117

UNITED STATES PATENT OFFICE 2,636,117

RADIO RECEIVING SYSTEM

Clifford E. Cox, Santa Ana, Calif., assignor to Edgar E. Cox, Los Alamitos, Calif.

Application February 21, 1949, Serial No. 77,591

8 Claims. (Cl. 250—20)

The present invention relates to an improved radio receiving system adapted especially to receive carrier waves amplitude modulated by a frequency modulated supersonic subcarrier of the type, for example, generated and transmitted in the transmitter shown and described in my co-pending United States patent application, Serial No. 49,099, filed September 13, 1948, for Signalling System, now abandoned, the disclosure in said co-pending patent application being incorporated herein by this reference thereto as if fully set forth herein.

The object of the present invention is to provide an improved radio receiving system for use in the secrecy communication system described in the above-mentioned co-pending patent application.

A specific object of the present invention is to provide an improved radio receiver for the radio receiving system described in the above-mentioned co-pending patent application.

Another object of the present invention is to provide an improved communication system incorporating a novel improved radio receiver especially adapted to receive and to reproduce the modulation components of a carrier wave amplitude modulated by a frequency modulated supersonic subcarrier.

Still another object of the present invention is to provide an improved radio receiving system especially adapted for multiplexing uses.

Yet a further object of the present invention is to provide an improved radio receiving system characterized by the fact that it has two different ganged-tuned circuits, one of said circuits being adapted to tune in the basic carrier wave while the other tuned circuit is adapted to be adjusted to reproduce the modulation components of a frequency modulated supersonic subcarrier transmitted on said basic carrier.

Another object of the present invention is to provide an improved system for the reception of narrow band frequency modulated waves.

The features of the present invention which are believed to be novel are set forth with particularity in the appended claims. This invention itself, both as to its organization and manner of operation together with further objects and advantages thereof, may be best understood by reference to the following description taken in connection with the accompanying drawings, in which:

Figure 1:
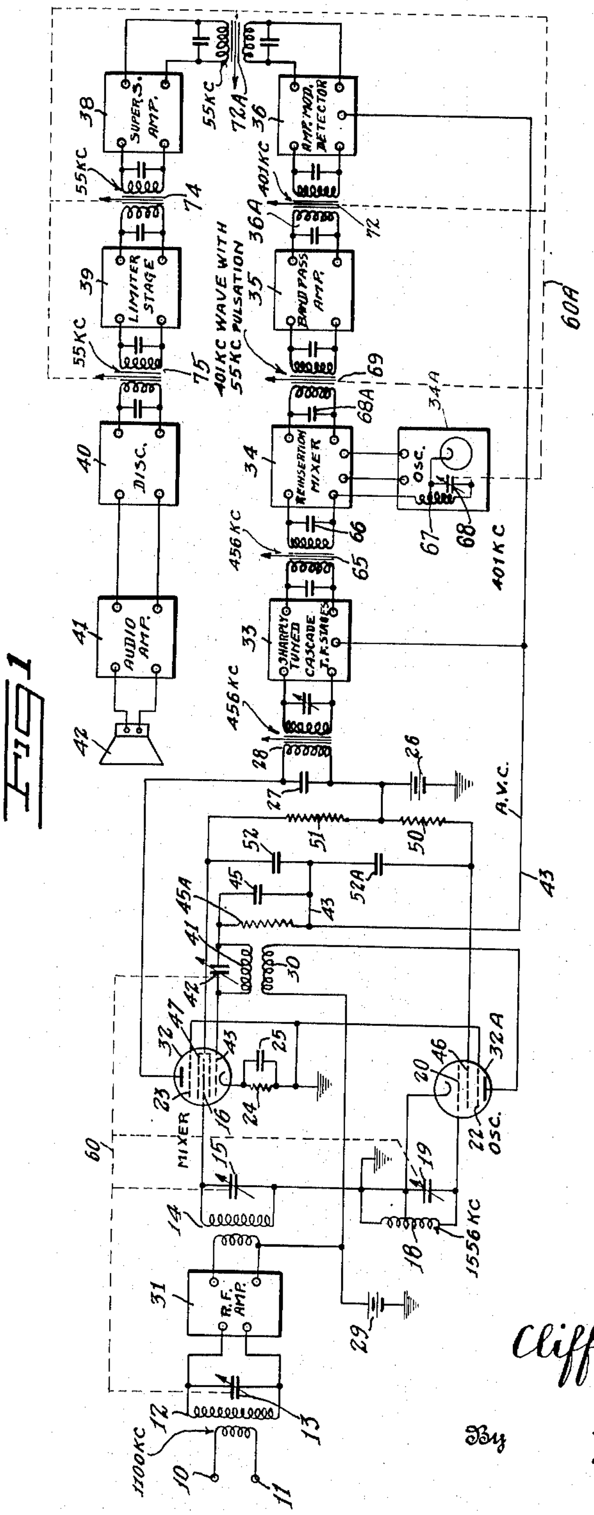
Figure 1 is a schematic circuit diagram showing a receiver embodying certain features of the present invention which is useful with the transmitter described in my above-mentioned co-pending patent application.

The radio receiver, shown in Figure 1, has its input terminals 10, 11 in a link circuit which is coupled to the tuned circuit 12, 13, in the input circuit of the R. F. amplifier stage 31. The output of such stage 31 is magnetically coupled to the tuned circuit 14, 15 which has one of its terminals connected to grid 16 of the mixer stage 32 and the other one of its terminals connected to a first grounded terminal in the tank circuit 18, 19 of the oscillator stage 32A, a second terminal of the circuit 18, 19 being connected to the oscillator grid 20, and an intermediate point on the coil 18 being connected to the cathode of stage 32A. Grids 22 and 23 of stages 32A and 32, respectively, are grounded. Also the cathode of device 32 is grounded through the grid bias providing means 24, 25.

The anode of device 32 is supplied with space current from the positive ungrounded terminal of unidirectional voltage source 26 through the tuned output circuit 27, 28. The anode of stage 32A is supplied with space current from unidirectional voltage source 29 through the winding 30 which is magnetically coupled to the tuned circuit 41, 42, one terminal of said tuned circuit 41, 42 being connected to the electrode 43 of stage 32, while the other terminal of such tuned circuit is connected to the A. V. C. lead 43 through the condenser 45 and resistance 45A connected in shunt thereto.

Space current for electrodes 46, 47 in device 32A, 32 is supplied from the positive terminal of source 26, respectively, through voltage dropping resistances 50 and 51. A by-pass condenser 52 is connected between electrode 47 and the A. V. C. 43. Also, a by-pass condenser 52A is connected between lead 43 and electrode 46.

The circuit thus far described has each one of the tuning elements 13, 15, 19 and 42 ganged for unicontrol as indicated by the dotted line 60 to effect amplification and conversion of the received carrier wave or sideband wave applied to terminals 10, 11.

Such received carrier or sideband waves on terminals 10, 11 are produced by the transmitter described in my above-mentioned co-pending patent application and comprises a transmitted sideband of a wave amplitude modulated by a frequency modulated supersonic subcarrier. Such amplitude modulated carrier wave, as described in my co-pending patent application, may have a mean frequency of 1100 kilocycles, the components of which may, for example, be a basic carrier wave of 1045 kilocycles amplitude modulated by a frequency modulated supersonic subcarrier of 55 kilocycles. Thus, the circuit 12, 13 is tuned to a mean frequency of 1100 kilocycles (1045+55), while the tank circuit 18, 19 is tuned to 1556 kilocycles and the output circuit 27, 28 is fixed-tuned at a resonant frequency of 456. The tuned circuit 14, 15 is simultaneously tuned to a mid-frequency of 1100 kilocycles. Simultaneously, the tuned circuit 41, 42 is tuned to 1556 kilocycles in which case the received sideband is initially amplified in stage 31 and converted in the mixer oscillator stage 32, 32A to produce a modified sideband having a mean frequency of 456 kilocycles which is applied to the input terminals of the sharply tuned cascade-connected intermediate frequency stages 33. These stages 33 are tuned as sharply as possible and, preferably, crystal elements are used in the well-known manner to obtain sharp tuning whereby such I. F. stages 33 serve also, in a sense, as a filter network for rejecting signals other than those having a mean frequency of 456 kilocycles plus or minus 250 cycles, it being noted that 250 cycle variation comprises the frequency modulation components of the transmitted wave. This network 33 serves therefore to filter out all interfering or static disturbances of frequency greater than 500 cycles. It is thus observed that the signal in all stages of the receiver, from the antenna through the I. F. stages 33, is a frequency-modulated signal.

The amplified output of such stage 33, a frequency-modulated signal, is applied to the input circuit of the re-insertion mixer stage 34 having its input circuit 65, 66 sharply tuned to a frequency of 456 kilocycles. The mixer stage 34 is non-linear to produce the modulation components mentioned hereinafter, i. e., the modulation component of 55 kilocycles and 857 kilocycles. The oscillator stage 34A has its tank circuit 67, 68 sharply tuned to produce oscillator voltages having a frequency of 401 kilocycles when it is desired to reproduce the modulating components on the 55 kilocycle subcarrier. A portion of such oscillatory voltage is applied to the mixer stage 34 having its output circuit 68A, 69 broadly tuned to 401 kilocycles and coupled to the input tuned circuit of the band pass amplifier stage 35. The frequency of 401 kilocycles is related to the intermediate frequency of 456 in the sense that the difference frequency, i. e., 55 kilocycles is the frequency of the subcarrier which is being received and the frequency modulation components thereof reproduced. It should be observed that the signal applied from stage 33 to stage 34 is a 456 kilocycle wave which is amplitude modulated by a 55 kilocycle frequency modulated wave. Thus, when the oscillating signal of 401 kilocycles is introduced into stage 34, there is produced by heterodyne action a signal having a difference frequency of 55 kilocycles, i. e., the same frequency as the desired subcarrier. This signal thus produced having a frequency of 55 kilocycles interacts with the frequency modulated subcarrier which has a mean frequency of 55 kilocycles to produce a pulsating signal or pulsations. Such resulting pulsations appear as modulation components of the 401 kilocycle wave which is applied to the input terminals of the band pass amplifier 35. The output circuit of such amplifier 35 is tuned to 401 kilocycles and coupled to the amplitude modulation detector stage 36 to separate the amplitude or pulsation modulation components of the 401 kilocycle signal applied to such stage. Such amplitude modulation components arise from the fact that the frequency modulated supersonic subcarrier has a mean frequency of 55 kilocycles and is mixed with the 401 kilocycle signal, i. e., the 401 kilocycle signal may be considered to have a 55 kilocycle pulsation imposed on it. This is true since the addition of a sine wave of constant amplitude to a frequency- or phase-modulated wave of constant amplitude results in a wave having amplitude variations, such amplitude variations in the present instance being detected by the detector stage 36. It is observed that another modulation component appears with a frequency of 857 kilocycles, but such modulation component serves no useful function and, as a matter of fact, the result of the same is effectively rejected by the transformers 69 and 72 which serve to pass a 401 kilocycle wave having pulsations therein including pulsations of 55 kilocycles, but not greatly exceeding the same to such an extent that an 857 kilocycle pulsation is likewise passed, i. e., any 857 kilocycle pulsation is rejected by transformers 69 and 72. Thus, it is seen that such portion of oscillatory voltage introduced in reinsertion mixer 34 effects an amplitude modulated wave, having as a modulation component, the 55 kilocycle signal. The output circuit of such stage 36 is sharply tuned by the magnetic core member 72 to such frequency of 55 kilocycles, as is the input circuit of the cascade-connected supersonic amplifier stage 38. The stage 38 has its output circuit sharply tuned to 55 kilocycles and magnetically coupled to the sharply tuned input circuit of the limiter stage 39, the input and output circuits of stages 38 and 39 being variably tuned by the variably positioned core member 74. The purpose of limiter stage 39 is conventional and serves to remove substantially all of the amplitude variations in the frequency modulated wave applied thereto. After limiting in the stage 39, the resulting limited frequency modulated signal is applied from the sharply tuned output circuit of stage 39 to the sharply tuned input circuit of the discriminator stage 40, the output and input circuits of stages 39 and 40 being likewise tuned by the variably positioned magnetic core member 75. After the audio modulation components of the frequency modulated wave are separated in the stage 40, they are successively applied to the audio amplifier stage 41 and speaker 42. It is noted that there are two different groups of elements which are ganged for unicontrol. One such group of elements comprises the tuning elements 13, 15, 19 and 42, and they are operative essentially to select the transmitted carrier which has a mean frequency corresponding to the resonant frequencies of such tuned circuits. The second group of ganged tuning elements adapted for unicontrol are the tuning elements 69, 72, 72A, 74 and 75, which serve essentially to select the desired supersonic subcarrier, the particular supersonic subcarrier being determined by the tuning of such circuits. In the example described above, the supersonic frequency modulated subcarrier has a mean frequency of 55 kilocycles.

It is noted that the amplitude modulation detector stage 36 performs an important function, namely, it operates in conjunction with the previously described sharply tuned circuits in stage 33 to eliminate static and other undesired amplitude variations. Stage 33 is sharply tuned so that the wave passed therethrough has a width substantially less than 55 kilocycles, i. e., a width in the order of 500 cycles whereby such static and other undesired amplitude variations are limited to those of frequency less than said 55 kilocycles, i. e., in the order of 500 cycles. Then, when the wave, thus initially modified with respect to the noise and other disturbances thereon, is applied to the reinsertion mixer stage 35, the wave, originally in the form of a side band, is effectively transformed into an amplitude modulated wave whose modulation components are comprised of, first, the frequency modulated supersonic subcarrier of 55 kilocycles and, also, such modified static and other undesired amplitude variations of frequency less than 55 kilocycles, i. e., in the order of 500 cycles. Such produced amplitude modulated wave is amplified in stage 35, wherein all frequency components thereof are amplified in the same degree before being applied to the amplitude modulation detector stage 36. In stage 36, the amplitude modulation components of the wave applied thereto are detected but the tuned circuit 72A, tuned to a frequency of 55 kilocycles passes only those modulation components of substantially the same frequency, i. e., the supersonic subcarrier of 55 kilocycles. The circuit 72A does not pass any voltages produced by noise or other disturbances, since the frequency of such voltages is limited, as previously described, to a range less than 55 kilocycles, i. e., in the order of 500 cycles. The supersonic frequency modulated component of 55 kilocycles is then amplified in the stage 38 which is preferably sharply tuned for multiplexing purposes. It is noted that, at this point, the 55 kilocycle frequency modulated wave has amplitude variations therein, corresponding to noise voltage, previously limited in frequency to those less than 55 kilocycles, i. e., in the order of 500 cycles. Such amplitude variations in the supersonic wave of 55 kilocycles may result, for example, by heterodyne action in common circuit elements in the detector stage 36 such as the anode of the detector tube in such stage 36. Obviously, these variations, due to such heterodyne action, are relatively small and may be eliminated in the limiter stage 39. Thus, when the signal reaches the discriminator stage 40, it is effectively free of static and other disturbances.

In multiplexing operations, wherein the original carrier wave has the same mean frequency of 1100 kilocycles, and it is desired to select a different subcarrier, the ganging control 60 is not disturbed, but the ganging control 60A, which controls the tuning elements 68, 69, 72, 72A, 74 and 75, is adjusted to a frequency corresponding to the desired subcarrier. As disclosed more fully in my above mentioned copending application, the original carrier wave radiated from the transmitter is in the form of a sideband and may be produced, for example, as the upper sideband of a basic carrier of 1050 kilocycles modulated by a 50 kilocycle subcarrier. For example, when the basic carrier is 1050 kilocycles, the corresponding subcarrier is 50 kilocycles; when the basic carrier is 1045 kilocycles, the corresponding subcarrier is 55 kilocycles. These two examples illustrate that, at all times, the transmitted wave, in the form of the upper sideband, is the above mentioned mean carrier frequency of 1100 kilocycles, i. e., 1050 plus 50, or 1045 plus 55, and so forth. Since the transmitted waves then each have the same mean carrier frequency irrespective of the frequency of the subcarrier, it is not necessary to retune either one of the stages 32, 32A, or 33.

The term "basic carrier frequency" as used herein refers to the frequency of the unmodulated wave, for example, 1045, 1055, and so forth, as the case may be, generated at the transmitter and appearing at the grid of the amplitude modulated stage 21 in my above mentioned copending application.

The term "mean carrier frequency" is the frequency of a sideband radiated from the transmitter and received in the receiver, such sideband being one of those produced upon amplitude modulating the basic carried with the frequency modulated subcarrier, and, in the examples cited, this sideband is the upper sideband and is at all times of the same frequency, i. e., in each of the examples given above, 1100 kilocycles.

The term "virtual carrier frequency" as used herein refers to the received or mean carrier after it has been converted in frequency by, for example, heterodyning, to a similarly constant frequency.

At the receiver, if it is desired to select the subcarrier having a mean frequency of 50 kilocycles, the ganging control 60A is adjusted correspondingly, namely, the circuit 42, 67, 69 is tuned to 406 kilocycles, and the tuning elements 72A, 74 and 75 adjusted to tune their associated circuits to 50 kilocycles. In other words, as alluded to previously, the oscillator stage 34A produces a signal which is related in a definite manner to the intermediate frequency of 456 kilocycles and with respect to the frequency of the desired subcarrier, i. e., the frequency of the oscillations developed in stage 34A differs from the intermediate frequency of 456 kilocycles in an amount which is equal to the frequency of the desired subcarrier.

It is desirable to interpose the sharply tuned cascade-connected I. F. stages 33 between the stages tuned by the unicontrol 60 and the stages controlled by the unicontrol 60A. Preferably, crystal filters are used in conventional manner in stages 33 to obtain sharp tuning and rejection of undesired signals.

The purpose of the oscillator stage 34A serves essentially to reinsert a carrier wave in single sideband operation. In other words, the original signal received at terminals 10, 11 is a single sideband and it is desirable, therefore, to reinsert a virtual carrier by the use of oscillator stage 34A before detection in the stages 36 and 40. Such virtual carrier is not the received carrier, but the received or mean carrier at a different frequency, which frequency corresponds to the difference in frequency between the basic carrier of, for example, 1045 kilocycles and 1556 kilocycles, the last mentioned frequency being the tuned frequency of the heterodyning oscillator stage 32A.

Thus, the signal produced at the amplitude modulated stage 21 in the transmitter in my above mentioned copending application is essentially reproduced at the reinsertion mixer stage 34 of the receiver shown herein. One of the important features of the present invention is that such renisertion occurs after the received wave passes through the partially tuned cascade I. F. stages 33, which serve initially to reject or filter interfering signals and to enhance the selectivity as mentioned above.

These results obtained by the use of the sharply tuned I. F. stages 33, disposed before the reinsertion stage, would not be realized if the insertion had taken place before the received signal is introduced to such stages instead of after the modified signal passes through such stage. This is so because, after reinsertion, wide band channels or stages are required to handle the reconstructed carrier with its modulation components, such modulation components being displaced from the basic carrier of, for example, 1045 kilocycles by a frequency of, for example, 55 kilocycles.

The receiving system shown in Figure 1 may also be used to receive a narrow band frequency modulated wave and to reproduce the modulation components thereof. This is so since the wave generated in the transmitter described and claimed in my above-mentioned co-pending application is essentially a narrow band frequency modulated wave. In other words, the receiver shown in Figure 1 may be used not only to receive and reproduce modulation components of the waves transmitted by the transmitter described in the above-mentioned co-pending application, but also the receiving system shown in Figure 1 may be used to receive and to reproduce modulation components of conventional narrow band frequency modulated waves.

For example, if it is desired to receive a narrow band frequency modulated carrier having a mean frequency of 1200 kilocycles, the uni-tuning control 60 is adjusted to tune its associated circuits to 1200 kilocycles and the tuning of the unicontrol 60A is not critical so long as the associated circuits are tuned within the range of, for example, 40 to 70 kilocycles. However, it is noted that substantially only the frequency modulation components below 500 cycles are detected because of the sharply tuned cascade I. F. stages 33.

Figure 2:
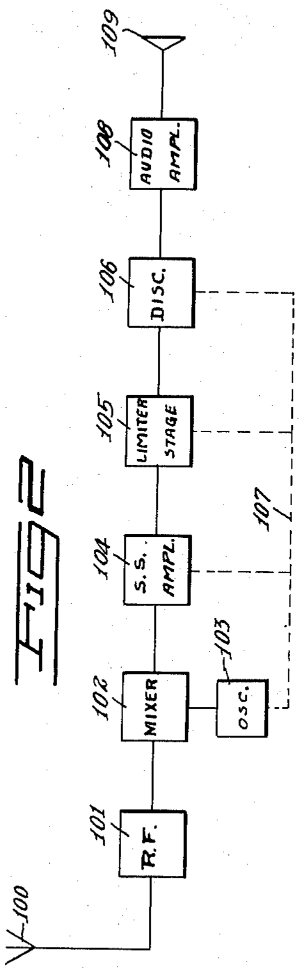
Figure 2 is a schematic diagram showing a receiver also embodying features of the present invention.

In the modification shown in Figure 2, the receiving system described therein is intended for the reception of frequency modulated waves only, but may be used to derive the intelligence in the frequency modulated subcarrier transmitted as a modulation component in the form of a sideband as transmitted by the transmitter in my above mentioned copending application, and thus either narrow band or sideband frequency modulated waves may be received. In Figure 2, the waves are received on antenna 100 amplified in the radio frequency amplifier stage 101 which is fixed-tuned to a frequency of 1100 kilocycles (1050 plus or minus 50 kilocycles) for the amplification of received waves generated in the transmitter described in my above-mentioned copending patent application. After amplification in the stage 101, the resulting amplified wave is applied to the mixer stage 102 which is fed with oscillatory voltages from the oscillator stage 103. The oscillator stage 103 is tuned to 1050 cycles so that a supersonic signal having a mean frequency of 50 cycles (1100 minus 1050) is impressed on the input circuit of the supersonic amplifier stage 104. After amplification in the stage 104, the resulting amplified supersonic signal is limited in limiter stage 105 before being applied to the discriminator stage 106. The stages 104, 105 and 106 are conventional in that they include tuned circuits, tuned to a frequency of 50 kilocycles. These tuned circuits in stages 104, 105 and 106, as well as the tank circuit of the oscillator stage 103, are ganged for unicontrol by a unicontrol represented by the dotted line 107.

The modulation components of the frequency modulated wave after detection in the discriminator 106 are applied successively to the audio amplifier 108 and speaker 109. It is noted that the unicontrol 107 serves substantially the same function as the unicontrol 60A, i. e., to select a particular supersonic modulating frequency of the carrier wave applied to antenna 100 or to the terminals 10, 11, as the case may be. In other words, the circuit shown in Figure 2 may also be used for multiplexing. As described above, the unicontrol 107 is adjusted for a frequency of 50 kilocycles. If the 40 kilocycle signal is desired, corresponding unicontrol 107 is tuned to 40 kilocycles, it being remembered that in such case the carrier wave has still a mean frequency of 1100 kilocycles (1060 plus 40) and the oscillator stage 103 is tuned to 1060 kilocycles.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A radio receiving system incorporating an input circuit to develop a voltage which comprises a wave which is amplitude modulated by a frequency modulated subcarrier in accordance with the transmitted intelligence, amplifying and frequency converting means arranged to first amplify and then change the mean frequency of said received voltage to an intermediate frequency voltage, a sharply tuned intermediate frequency stage coupled to said amplifying and converting means, said intermediate frequency stage being coupled in turn to a reinsertion mixer stage with associated means for developing a signal having a frequency which differs from said intermediate frequency in an amount equal to the frequency of said subcarrier to thereby develop a pulsating wave, an amplitude modulation detector coupled to said reinsertion mixer stage to isolate said pulsations, and a frequency discriminator stage coupled to said amplitude modulation detector stage to detect frequency modulation components in said pulsations.

2. A receiving system adapted to receive a side band of a carrier wave amplitude modulated by a frequency modulated supersonic subcarrier, an input circuit adapted to receive the transmitted side band to develop a received signal voltage, frequency converting means adapted to change the mean frequency of the received single side band signal voltage, a sharply tuned network of intermediate frequency coupled to said converting means, a reinsertion mixer stage coupled to said sharply tuned network including an oscillator arranger to develop a voltage of frequency which differs from said intermediate freuqency in an amount equal to the mean frequency of said subcarrier, the output circuit of said mixer stage being tuned to the frequency of oscillations generated in said oscillator, an amplitude modulation detector stage coupled to said reinsertion mixer stage to separate said subcarrier, and a discriminator stage coupled to said amplitude modulation detector to separate the modulation components of said frequency modulated subcarrier.

3. A radio receiving system adapted to receive a side band of a carrier wave amplitude modulated by a frequency modulated supersonic subcarrier, an input circuit adapted to produce a received side band voltage, a tuned amplifying and a tuned mixer stage adapted to first amplify and then convert the mean frequency of said received single side band voltage to an intermediate frequency, the tuning elements of said amplifying and mixing stages being ganged to produce a substantially constant frequency voltage at its output terminals regardless of the setting of said tuning elements, a sharply tuned stage coupled to the output of said frequency converting stage and tuned to said intermediate frequency, a reinsertion mixer stage coupled to the output of said sharply tuned stage, said mixer stage incorporating an oscillator, the output circuit of said mixer stage being tuned to the frequency of oscillations generated in said oscillator which differs from said intermediate frequency in an amount equal to the mean frequency of said subcarrier, said oscillator incorporating a variable tuning element, an amplitude modulation detector coupled to said reinsertion mixer stage to separate said supersonic subcarrier, and a discriminator stage coupled through a plurality of tuned circuits to said amplitude modulation detector to separate the modulation components of said subcarrier, said tuned circuits having adjustable tuning elements, said tuning elements of said last mentioned circuits being ganged for unicontrol with the tuning element of said oscillator stage to thereby allow selection of a desired subcarrier.

4. In a radio receiving system of the character described, means arranged to develop an input voltage which is amplitude modulated by a frequency modulated subcarrier in response to transmitted intelligence, a mixer stage incorporating an oscillator stage coupled to the last mentioned means, a tuned supersonic amplifier and tuned discriminator stages, each tuned to the mean frequency of said subcarrier and coupled to said mixer stage, said oscillator stage being tunable and the tuning elements of said oscillator stage, supersonic amplifier and discriminator stages each being ganged for unicontrol, and an amplitude modulation detector stage coupled between said mixer stage and said supersonic amplifier.

5. A radio receiving system for reproducing intelligence from a received single side band of a wave amplitude modulated by a supersonic frequency modulated subcarrier, a frequency converting stage arranged to change the mean frequency of the received single side band to an intermediate frequency, a narrow band filtering network coupled to said converting stage, a reinsertion mixer stage coupled to said narrow band filtering stage and incorporating means for developing a signal having a frequency which differs from said intermediate frequency in an amount equal to the mean frequency of said subcarrier, an amplitude modulation detector stage coupled to said reinsertion mixer stage, and a discriminator network coupled to said amplitude modulation detector stage.

6. In a radio receiving system of the type arranged to receive intelligence on a transmitted single side band of a wave amplitude modulated by a frequency modulated supersonic subcarrier, a frequency converting stage arranged to change the mean frequency of the received single side band to an intermediate frequency, a narrow band filtering network coupled to said converting means, a reinsertion mixer coupled to said filtering network, said reinsertion mixer stage incorporating an oscillator stage tuned to produce a wave of mean frequency which differs from said intermediate frequency in an amount equal to the mean frequency of said subcarrier so as to produce a modified wave amplitude modulated by a frequency modulated subcarrier, with pulsations thereon of frequency corresponding to the mean frequency of said subcarrier, an amplitude modulation detector stage coupled to said reinsertion mixer stage to detect said pulsations, and a discriminator network coupled to said amplitude modulation detector stage to reproduce the frequency modulation components of said pulsations.

7. In a receiving system of the character described, frequency converting means incorporating a tunable oscillator for developing a signal of intermediate frequency from a wave which is amplitude modulated by a frequency modulated subcarrier, a supersonic tunable amplifier stage, limiter stage and discriminator stage, coupled in turn to said converting means, the tunable elements of said oscillator stage, supersonic amplifier, limiter and discriminator stages being ganged for unicontrol with the tunable elements of said oscillator stage set to produce high frequency oscillations which differ in frequency from said intermediate frequency in an amount equal to the mean frequency of said subcarrier, and with said supersonic amplifier, limiter and discriminator stages set to the mean frequency of said subcarrier, and an amplitude modulation detector stage coupled between said converting means and said supersonic amplifier.

8. In a radio receiving system of the character described, means arranged to develop a high frequency input voltage which is amplitude modulated by a frequency modulated subcarrier in response to transmitted intelligence, a mixer stage incorporating an oscillator stage coupled to the last mentioned means, a tuned amplifier and tuned discriminator stages coupled to said mixer stage, said oscillator stage being tunable to a frequency which differs from the frequency of said voltage, in an amount equal to the mean frequency of said subcarrier, and the tuning elements of said oscillator stage, amplifier and discriminator stages each being ganged for unicontrol, and an amplitude modulation detector stage coupled between said mixer stage and said discriminator stage.

CLIFFORD E. COX.

References Cited in the file of this patent

UNITED STATES PATENTS

| Number | Name | Date |
|---|---|---|
| 1,702,001 | Gill et al. | Feb. 12, 1929 |
| 1,918,433 | Smythe | July 18, 1933 |
| 2,085,791 | Carlson | July 6, 1937 |
| 2,103,847 | Hansell | Dec. 28, 1937 |
| 2,116,502 | Armstrong | May 10, 1938 |
| 2,193,801 | Byrne | Mar. 19, 1940 |
| 2,241,078 | Vreeland | May 6, 1941 |
| 2,363,288 | Bell | Nov. 21, 1944 |
| 2,402,606 | Davis | June 25, 1946 |
| 2,410,275 | Ellenberger | Oct. 29, 1946 |
| 2,445,664 | Doelz | July 20, 1948 |